Figure 1:
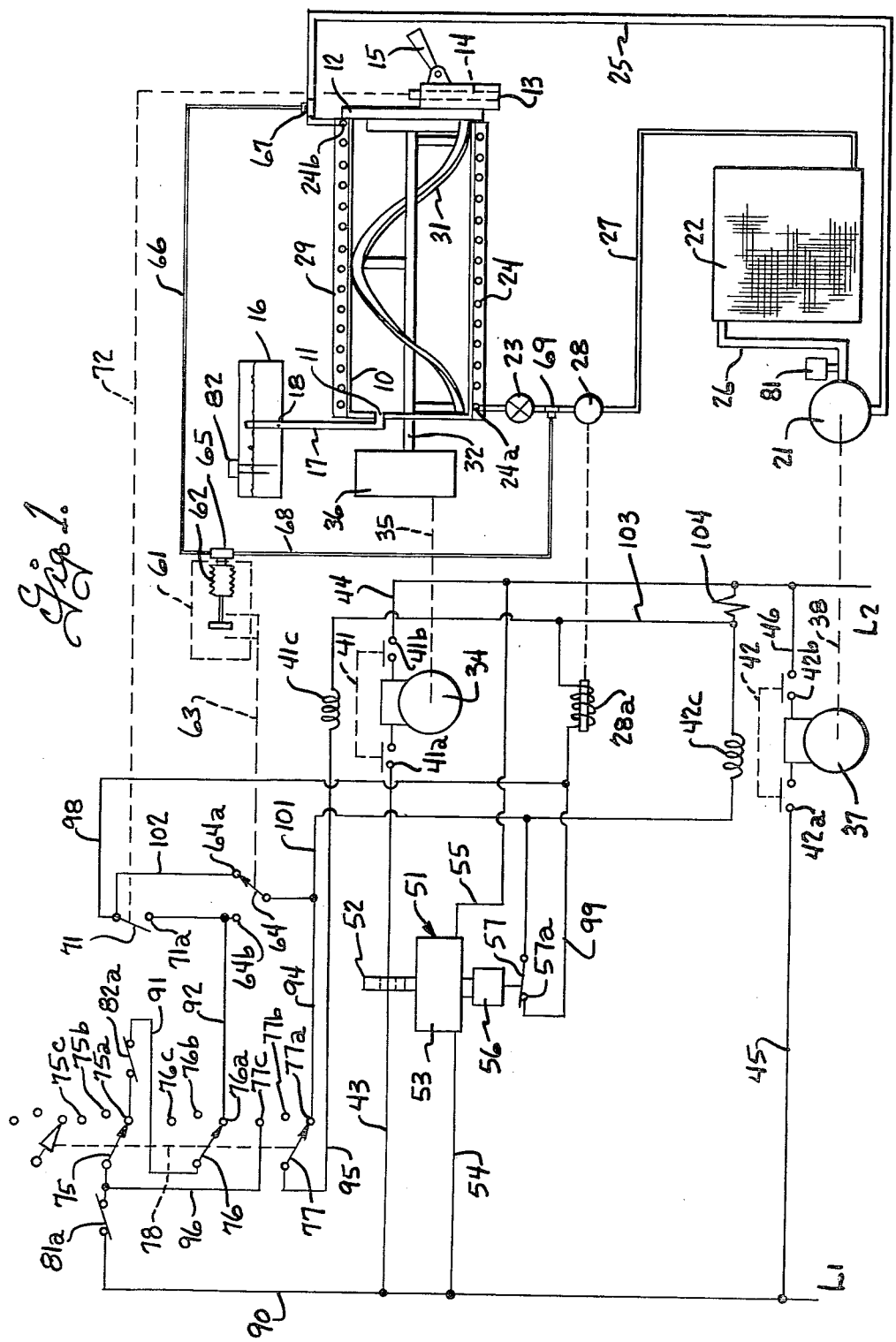

United States Patent [19]

Schwitters

[11] 4,275,567
[45] Jun. 30, 1981

[54] METHOD AND APPARATUS FOR CONTROLLING OPERATION OF A SOFT-SERVE MACHINE

[75] Inventor: Stephen W. Schwitters, Rockford, Ill.

[73] Assignee: Beatrice Foods Co., Chicago, Ill.

[21] Appl. No.: 135,492

[22] Filed: Mar. 31, 1980

[51] Int. Cl.³ .............................................. A23G 9/00
[52] U.S. Cl. ........................................ 62/63; 62/136; 62/228
[58] Field of Search .................. 62/136, 68, 342, 343, 62/228 D, 228 A

[56] References Cited

U.S. PATENT DOCUMENTS

| | | | |
|---|---|---|---|
| 2,559,032 | 7/1951 | Tacchella | 62/136 |
| 2,740,264 | 4/1966 | Thompson, Jr. | 62/343 X |
| 3,013,398 | 12/1961 | Thomas | 62/136 |
| 3,075,480 | 1/1963 | Berg | 62/136 X |
| 3,180,104 | 4/1965 | Goetz | 62/136 |
| 3,228,203 | 1/1966 | Swenson | 62/135 |
| 3,519,910 | 7/1970 | Pfaff et al. | 318/218 |
| 3,600,657 | 8/1971 | Pfaff et al. | 318/218 |
| 3,608,779 | 9/1971 | Cornelius | 222/54 |
| 3,642,174 | 2/1972 | Cornelius | 222/129 |
| 3,698,203 | 10/1972 | Stoelting | 62/136 |
| 3,823,571 | 7/1974 | Smith et al. | 62/136 |

*Primary Examiner*—William E. Tapolcai, Jr
*Attorney, Agent, or Firm*—Vernon J. Pillote

[57] ABSTRACT

A method and apparatus for controlling operation of a semi-frozen product dispensing machine. The control system includes a viscosity sensing mechanism for sensing the viscosity of the product in the freezing chamber and for shutting off flow of refrigerant to the freezing chamber evaporator when the product reaches the desired viscosity. The control system also includes a refrigerant pressure sensing mechanism for sensing the pressure on the refrigerant in the freezing chamber evaporator when the supply of refrigerant is shut off and for restarting the refrigerating mechanism when the refrigerant pressure in the evaporator rises to a preselected value. The control system also includes circuitry for restarting the refrigerating mechanism when the dispensing valve is opened.

18 Claims, 2 Drawing Figures

4,275,567

METHOD AND APPARATUS FOR CONTROLLING OPERATION OF A SOFT-SERVE MACHINE

BACKGROUND

It is especially difficult to maintain uniform consistency in the product intermittently dispensed from a soft-serve machine. As product is dispensed from one end of the freezing cylinder, new product ingredients are introduced into the other end of the freezing cylinder and must be congealed and homogenized. However, the product is only intermittenly dispensed from such machines and the duration of each dispensing operation and the intervals between dispensing operation varies widely. It is not only necessary to refrigerate the freezing cylinder to congeal the new product ingredients entering the freezing cylinder during the dispensing operation, but to also control refrigeration of the freezing cylinder between dispensing operations in a manner to compensate for heat losses to the ambient air and maintain the desired product consistency.

Various different control systems have heretofore been proposed for controlling refrigeration of the freezing cylinder and operation of the dasher in the cylinder for the purpose of controlling the consistency of the product being dispensed. Some control systems utilize temperature sensors to sense the temperature in the freezing cylinder and control operation of the refrigeration apparatus to maintain the temperature of the freezing cylinder in a range in which the product has the desired consistency. However, the temperature sensors only sense the temperature of the freezing cylinder at a localized area, generally adjacent the dispensing outlet and do not respond rapidly to changes in the product temperature remote from the outlet caused by new product ingredients entering the freezing cylinder.

Some other control systems sense the viscosity of the product in the freezing chamber, for example by sensing a torque required to drive the dasher in the freezing chamber. Of the control systems using viscosity type sensors, some drive the dasher continuously and turn the refrigeration to the freezing cylinder on and off under the control of the viscosity sensor. However, continued driving of the dasher after the product reaches its desired consistency not only wastes power but adversely affects the texture of some of the products due to the continued working of the semi-frozen product. The viscosity sensors do not accurately sense the product viscosity when the dasher is stopped and some control systems use the viscosity sensor to turn the refrigeration off when the product reaches a desired consistency, and then use a timer or some other program controller to turn the refrigeration and dasher drive back on at intervals between dispensing operations. However, the rate at which the product warms up in the freezing chamber when the refrigeration is shut off, varies with the ambient temperature and it is frequently desirable to operate the refrigeration mechanism either more or less frequently than that which would be indicated by a timer or similar mode control.

SUMMARY OF THE INVENTION

It is the object of the present invention to overcome the disadvantages of the prior art by providing a method and apparatus for controlling operation of a semi-frozen product dispensing machine in which a viscosity sensor senses the viscosity of the product in the freezing chamber when the chamber is being refrigerated and the dasher is driven, to stop the refrigeration of the freezing chamber when the product viscosity reaches a desired range and in which restarting of refrigeration of the freezing chamber is automatically effected in the intervals between product dispensing operations by a pressure sensitive control that senses refrigerant pressure in the evaporator, when the supply of refrigerant into the evaporator is shut off.

Accordingly, the present invention provides a method and apparatus for controlling operation of semi-frozen product dispensing machine of the type which includes a freezing chamber having an ingredient inlet and a product outlet and a dispensing valve operable to intermittently dispense product through the outlet, a rotary dasher in the freezing chamber and a dasher drive motor connected to the dasher, an evaporator in heat conducting relation with the freezing chamber having a refrigerant inlet and refrigerant outlet, refrigeration producer means including compressor and a condenser having a high pressure refrigerant supply line and a low pressure refrigerant return line and a compressor drive motor connected to the compressor, means connecting the low pressure refrigerant return line to the refrigerant outlet of the evaporator, and refrigerant expansion control means connecting the high pressure refrigerant supply line to the inlet of the evaporator and operative to control normal low side operating pressure in the evaporator, the control system including a viscosity sensing means operative when the dasher is driven for sensing the viscosity of the product in the freezing chamber, mechanism controlled by the viscosity sensor for shutting off supply of refrigerant to the evaporator when the viscosity of the product increases to the desired product consistency, pressure sensing means operative to sense the refrigerant pressure in the evaporator when the supply of refrigerant to the evaporator is shut off, means controlled by the pressure sensing means for supplying refrigerant to the evaporator when the pressure in the evaporator rises to a preselected pressure above normal low side pressure and at which preselected pressure the temperature of the refrigerant in the evaporator is below the freezing temperature of the product in the freezing chamber, means for sensing when the dispensing valve is open, means for supplying refrigerant to the evaporator when the dispensing valve is open, and means for driving the dasher at least while the refrigerant is supplied to the evaporator.

Figure 2:
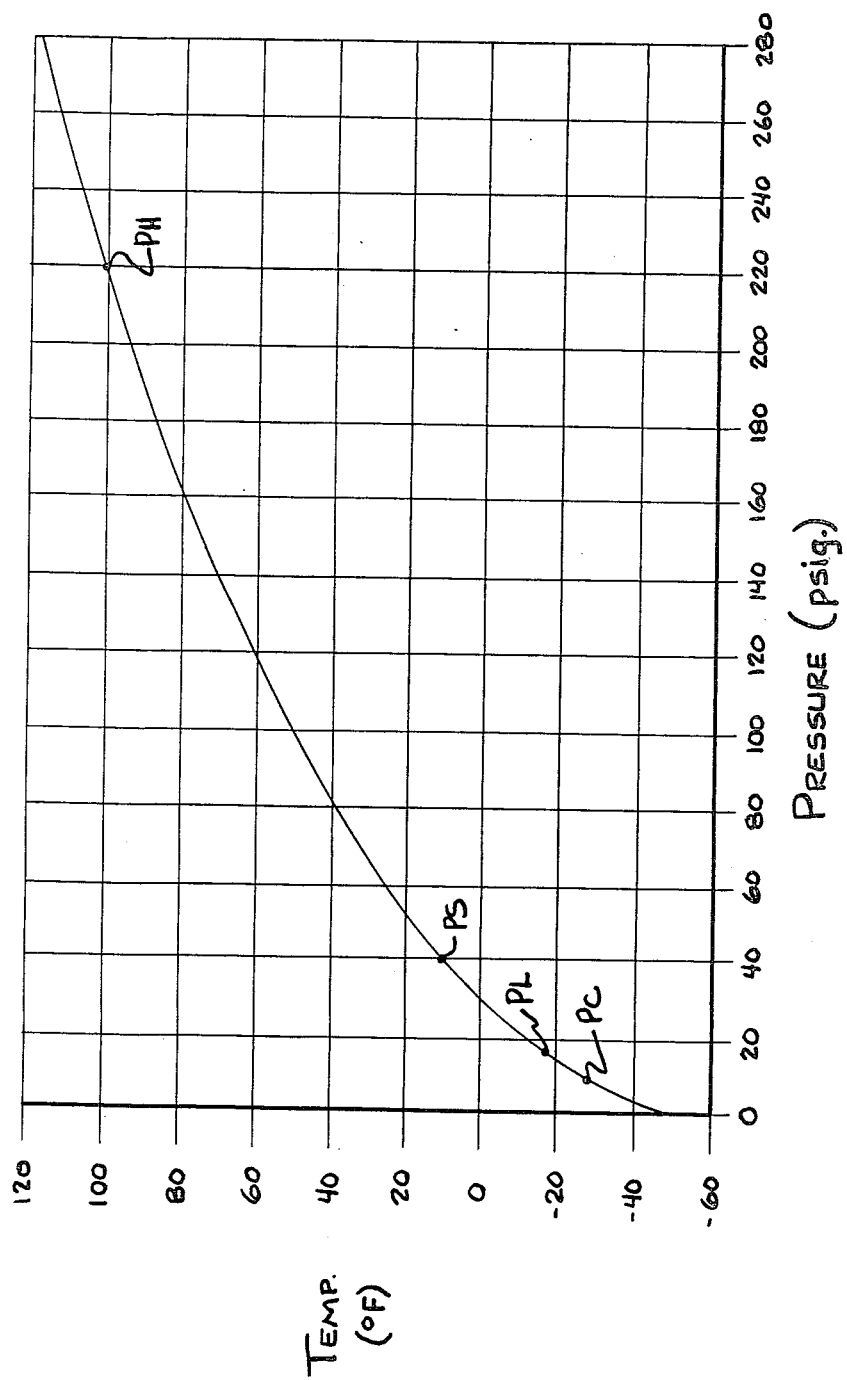

These, together with other features and advantages of this invention will be more readily understood by reference to the following detailed description when taken in connection with the accompanying drawings wherein:

FIG. 1 is a diagrammatic view of a semi-frozen product dispensing machine and the control system therefor; and FIG. 2 is a graph illustrating the pressure-temperature relation of the refrigerant in the evaporator.

Referring more specifically to FIG. 1 there is diagrammatically illustrated a freezing cylinder 10 having a product ingredient inlet 11 at one end and a head 12 closing the other end, and provided with a product outlet 13. One or more dispensing valves 14 are provided on the head for controlling flow through the product outlet and the dispensing valves are selectively operable between an open position allowing dispensing of product through the outlet 13, and a closed position blocking flow through the outlet, as by a manually operable handle 15. Product ingredients and air is supplied to the inlet 11 from a conventional mix supply which is operative to supply air and product ingredients to the inlet as the product is dispensed from the outlet. In the embodiment illustrated, the mix supply is of the gravity feed type including a reservoir 16 for product ingredients and connected by a standpipe 17 which allows air to enter the freezing cylinder and having a product inlet 18 adjacent the bottom of the reservoir to introduce liquid product ingredients into the freezing cylinder. Alternatively, a pressure system using a pump or pumps can be utilized to supply mix and a gas as air in proper proportions to the freezing cylinder.

A refrigerating mechanism is provided with refrigerating the freezing cylinder 10 and, as diagrammatically shown, includes a compressor 21, a condenser 22, a refrigerant expansion control 23, and an evaporator 24 disposed around the freezing cylinder 10 in heat conducting relation thereto. The evaporator 24 has an inlet 24a and outlet 24b and the outlet is connected through a low pressure refrigerant return line 25 to the suction or low pressure inlet of the compressor. The high pressure outlet of the compressor is connected through a line 26 to the condenser, and refrigerant under high pressure and in a liquid condition is passed through a line 27 to the refrigerant expansion control 23. The refrigerant expansion control 23 is of conventional construction and is preferably a pressure control expansion valve that senses the pressure at the downstream or evaporator side of the expansion control and maintains the pressure in the evaporator at a predetermined low side operating pressure, when the compressor is running and refrigerant is supplied to the expansion control. For reasons pointed out hereinafter, a solenoid operated refrigerant control valve 28 is provided in the high pressure refrigerant supply line 27 at a location ahead of the refrigerant expansion control 23 and the valve 28 is selectively operable under the control of a solenoid 28a. Valve 28 is a type that is normally closed and is actuated to its open position when the solenoid 28a is energized. As is conventional, an insulating jacket 29 is provided around the evaporator 24 and freezing cylinder 10 to minimize heat loss to the atmosphere.

A dasher or beater 31 is provided in the freezing cylinder for scraping frozen product from the walls of the freezing cylinder and for mixing and homogenizing the frozen product in the freezing cylinder. Dasher 31 has a shaft 32 rotatably mounted in the freezing cylinder and it is driven from a dasher drive motor 34 having its output shaft 35 connected through a speed reducing mechanism 36 to the dasher shaft 32 to drive the same. As is conventional, speed reducer 36 can be a gear mechanism or belt drive. Compressor 21 is driven from a compressor drive motor 37 having its output shaft 38 connected to the compressor. The dasher drive motor 34 is energized under the control of a dasher motor control relay 41 having contacts 41a and 41b and a coil 41c. Compressor drive motor 37 is operated under the control of a compressor motor relay 42 having contacts 42a and 42b and a coil 42c. As schematically shown in FIG. 1, the dasher drive motor 34 is connected through normally open relay contacts 41a and conductor 43 to power supply line $L_1$ and is connected through normally open relay contacts 41b and conductor 44 to the second power supply line $L_2$. Similarly, the compressor drive motor is connected through normally open relay contacts 42a and conductor 45 to power line $L_1$ and through normally open relay contacts 42b and conductor 46 to the other power supply line $L_2$.

A viscosity sensor 51 is provided for sensing the viscosity of the product in the freezing cylinder 10 and for actuating a switch when the viscosity reaches a predetermined range corresponding to the desired product consistency. The viscosity sensor is arranged to respond to the torque required to drive the dasher and, while different torque responsive viscosity sensors can be utilized, the viscosity sensor is advantageously of the type disclosed in U.S. Pat. Nos. 3,519,190 and 3,600,657. As disclosed more fully in those patents, the torque responsive viscosity sensor 51 is arranged to sense the torque of a motor by detecting the phase relationship between the current and voltage applied to the motor. As the torque required to drive the dasher increases, the phase relationship between the current and voltage applied to the motor changes and this change in phase relationship can be utilized operate a switch when the motor torque reaches a predetermined value. As diagrammatically illustrated in FIG. 1, the torque responsive viscosity sensor includes a current sensitive pick-up 52 which is arranged to sense the current flowing through line 43 to the dasher drive motor 34 and a control circuit 53 connected to the power supply lines $L_1$ and $L_2$ through conductors 54 and 55. The control circuit 53 is connected to the current sensitive pick-up 52 and compares the phase of the current flowing through line 43 to the dasher drive motor 34 and with the phase the voltage applied to the dasher drive motor, and is operative to actuate an output relay 56 when the phase relationship between the current and voltage reaches a predetermined value indicative of the motor drive torque required to drive the dasher when the product in the freezing cylinder is at the desired viscosity. Torque sensor relay 56 is arranged to move a viscosity switch 57 from a first condition, herein shown as a normally closed condition engaging contact 57a, when the motor drive torque is below a predetermined value, to a second or open condition when the torque reaches a predetermined value. For reasons pointed out more fully hereinafter, relay 56 is of a type which is operative, when actuated, to move the switch 57 to its open position and to hold it in its open position for a short time interval, for example of the order of twenty seconds, and then allow the switch 57 to reclose.

The control system also includes a refrigerant pressure sensor 61 for sensing the pressure of the refrigerant in the evaporator, when the flow of refrigerant to the evaporator is shut off. When the flow of refrigerant to the evaporator is shut off, the product in the freezing cylinder gradually starts to warm up due to the ambient air around the evaporator and freezing cylinder. The refrigerant pressure conditions in the evaporator, when the flow of refrigerant to the evaporator is shut off is correlative with the temperature of refrigerant in the evaporator and hence correlative with the temperature of the product in the freezing cylinder. The refrigerant pressure sensor 61 is a standard pressure control switch of a type which will move a switch from a first condition to a second condition when the pressure reaches a preselected upper value, and which will maintain the switch in the second condition until the pressure thereafter drops to a preselected lower value. As diagrammatically illustrated in FIG. 1, the pressure sensor 61 includes a bellows or diaphragm 62 which is operative through an actuator mechanism 63 to move a pressure switch 64. The pressure switch 64 is movable from a first condition engaging contact 64a to a second condition engaging contact 64b, when the pressure sensed by the bellow 62 reaches a preselected upper value, herein sometimes referred to as the cut-in pressure. Switch 64 will remain in engagement with contact 64b when the pressure thereafter drops, until the pressure reaches a preselected lower value, herein sometimes referred to as the cut-out pressure, at which time the bellows 62 operates through actuator 63 to move the switch 64 back into engagement with the contact 64a.

The pressure sensor 61 is connected in the refrigerant system so as to sense the pressure in the evaporator 24 when the refrigerant supply to the evaporator is shut off. In addition, provision is made for applying pressure to the pressure sensor 61 when the refrigerant supply to the evaporator is re-established, to assure movement of the pressure switch to its cut-in position. As diagrammatically shown in FIG. 1, the pressure sensing bellow 62 has a T-fitting 65 which is connected through a capillary tube 66 and T-fitting 67 to the low pressure refrigerant return line 25. The bellows T-fitting 65 is also connected through a second capillary tube 68 to a T-fitting 69 in the high pressure refrigerant supply line 27, at a location intermediate the solenoid operated refrigerant control valve 28 and the refrigerant expansion control 23. When the solenoid operated refrigerant control valve 28 is shut off, the pressure sensor 61 will sense the pressure in the evaporator 24 through capillary 66. However, when the refrigerant control valve 28 is opened and the compressor is operating, high pressure refrigerant from high pressure line 27 will flow through capillary tubes 68 and 66 to the refrigerant return line. The size and length of the capillary tubes 68 and 66 are selected so that the pressure applied to the pressure sensitive bellows 62, when refrigerant is supplied to the evaporator, is sufficiently above the cut-in pressure, to actuate the pressure sensitive switch 64 to its second condition into engagement with contact 64b.

The control system also includes a draw switch 71 which is operate in response to opening and closing of the dispensing valve 14. The draw switch 71 is operatively connected to the dispensing valve operator through an actuator diagrammatically indicated at 72, and the draw switch 71 is movable from a normally open position shown in FIG. 1 to a closed position engaging contacts 71a, when the dispensing valve is moved to its open position.

The control system also includes a mode control switch including switches 75, 76 and 77. Switches 75, 76 and 77 are multiple position switches conveniently mechanically interconnected as indicated at 78 for movement together between the different positions. In particular, the switches 75, 76 and 77 are movable from a "auto" position engaging the a contacts thereof through an intermediate or standby position engaging the b contacts thereof, to a third or "wash" position engaging the c contacts thereof. In addition, the control system includes the usual safety switches such as a normally closed high pressure cut-out switch 81a operated by a pressure sensor 81 at the compressor outlet, and a normally closed mix supply cut-out switch 82a operated by a sensor 82 that senses the mix supply to the freezing cylinder is exhausted. In the gravity feed type mix supply illustrated the mix supply sensor 82 can be in the form of a liquid level sensor.

The viscosity switch 57, pressure switch 64 and dispensing switch 71 are electrically connected to the mode switches 75, 76 and 77 and to the motor control coils 41c and 42c and solenoid 28 so that, in the automatic mode, the refrigerant supply to the evaporator will be shut off by the viscosity sensor when the viscosity reaches the desired value, and the refrigerant supply to the evaporator will be re-established under the control of either the refrigerant pressure sensor or the draw switch. In the wash mode, the dasher drive motor can be energized independently of the compressor drive motor to facilitate cleaning. More particularly, power line $L_1$ is connected through conductor 90 and normally closed high pressure switch 81a to mode switch 75. Contact 75a of mode switch 75 is connected through the normally closed ingredient supply switch 82a and conductor 91 to the mode switch 76. Contact 76a of mode switch 76 is connected through a conductor 92 to contact 71a of draw switch 71 and to contact 64b of pressure switch 64. Pressure switch 64 is also connected through conductor 94 to contact 77a of the mode switch 77 and mode switch 77 is connected through conductor 95 to the dasher motor control coil 41c. The power line $L_1$ is also connected through conductor 90 and normally closed high pressure cut-out switch 81a and conductor 96 to the contact 77c of mode switch 77, to supply power to the dasher motor controller during the wash mode. Draw switch 71 is connected through a conductor 98 to the valve solenoid 28a and through conductor 99 to the contact 57a of the viscosity sensing switch 57. Draw switch 71 is also connected as through a conductor 101 to the compressor coil 42c and to the viscosity switch 57. In addition, contact 64a of the pressure switch is connected as through conductor 102 to the draw switch 71. The dasher motor coil 41c, solenoid 28a and compressor motor coil 42c are connected to a conductor 103 that is connected through a fuse or overload relay 104 to the other power line $L_2$.

Reference is now made to FIG. 2 which illustrates the pressure-temperature curve for the refrigerant utilized in the refrigeration system. The refrigerant and the high and low side operating pressures are selected in accordance with the product being frozen and the temperature to which it is to be frozen. For example, the pressure curve illustrated in FIG. 2 is for a commercial available refrigerant sold under the trademark "Freon 502". The high side operating pressure designated PH is of the order of 220 to 240 PSIG and the low side operating pressure PL, controlled by the expansion control 23, is selected to be of the order of 18 to 20 PSIG which, as shown in the pressure-temperature curve, will produce an evaporator temperature of the order of $-16$ to $-18$ degrees F. This evaporator temperature will produce a relatively rapid freezing of the product ingredient in the freezing chamber. The pressure sensor 61 is adjusted so that the low or cut-out pressure designated PC is somewhat below the normal low operating pressure, and the pressure sensor is adjusted so as to operate the pressure switch 64 from the position shown in FIG. 1 in engagement with contact 64a to its second position in engagement with contact 64b, when the pressure sensed by the pressure sensor rises to a preselected value designated PS in FIG. 2, and which is above the normal low side operating pressure PL. The pressure PS is selected to correspond to a refrigerant temperature that is still well below the freezing temperature of the product in the freezing chamber, so that the pressure switch is moved to its cut-in pressure before the freezing chamber rises to a temperature above the melting point of the product.

From the foregoing it is thought that the construction and operation of the machine for making and dispensing a soft-serve product and the control system therefor will be readily understood. When the mode switches 75, 76 and 77 are in their auto position, and assuming that the pressure switch is in its second position in engagement with contact 64b and the viscosity switch 57 is in its closed position in engagement with contact 57a, and the draw switch 71 is open, then power will be supplied from line $L_1$ through conductor 90, normally closed high pressure switch 81a, mode switch 75, normally closed mix level control switch 82a, mode switch 76, conductor 92, pressure switch 64 to the compressor motor control coil 42c to energize the compressor motor. Power will also be supplied from pressure switch 64 and conductor 94 through mode switch 77 and conductor 95 to the dasher motor control coil 41c to energize the dasher motor 34. In addition, power is supplied from the pressure switch 64 through conductor 101 and normally closed viscosity switch 57 and conductor 99 to the solenoid coil 28a to open the refrigerant flow control valve 28. Thus, the compressor 21 is driven and the refrigerant flow control valve 28 is opened so that refrigerant is supplied to the evaporator through the expansion control 23 which maintains the refrigerant pressure in the evaporator at a normal low side operating pressure designated PL in FIG. 2. Under normal operating conditions described above, refrigerant under pressure from the high pressure refrigerant supply line 27 also flows through capillary tubes 68 and 66 to the low pressure return line 25 and, as previously described, the size and length of the capillary tubes are selected so that the pressure at the refrigerant pressure sensor 61 under normal operating conditions is above the pressure PS at which the switch 64 is moved to its second condition, to thereby assure that the pressure switch remains in engagement with the contact 64b.

The dasher drive motor 34 drives the dasher 31 to scrape the frozen product off the walls of the freezing chamber and to also mix the product ingredients with a gas such as air that is introduced into the freezer chamber, to produce a homogeneous mixture. When the viscosity of the product in the freezing chamber increases, the torque of the dasher drive motor also increases and this is sensed by the viscosity sensor 51. When the torque reaches a preselected value, indicated by a change in the phase relationship of the current and voltage in the dasher drive motor, the viscosity sensor opens the normally closed viscosity switch 57 and de-energizes the solenoid 28a to allow the refrigerant control valve 28 to close. This shuts off supply of refrigerant to the evaporator and to the capillary tube 68 so that the pressure sensor 61 thereafter senses the pressure in the evaporator through capillary tube 66. The compressor 21 continues to operate for a short time interval sufficient to pump down the evaporator and lower the evaporator pressure until it reaches the lower cut-out pressure PC. At that time, the pressure sensor actuates the pressure switch 64 from its second condition in engaging contact 64b to its first condition engaging contact 64a. When the pressure switch is moved to its first condition, it shuts off power to the compressor motor control coil 42c and to the beater motor control coil 41c to stop the compressor and dasher.

When the refrigerant supply to the evaporator is shut off, as occurs when the compressor is stopped, the product in the freezing chamber will slowly warm up due to heat gain from the ambient air. When the pressure in the evaporator rises to the preselected pressure PS, the pressure sensor 61 will move the pressure switch 64 from its first condition back to its second condition engaging contact 64b. As previously described, the pressure sensor 61 is adjusted so that the preselected pressure PS in the evaporator corresponds to a temperature that is still below the freezing temperature of the product in the freezing chamber, so that the compressor and dasher are restarted before the product begins to melt.

Provision is also made for restarting the compressor and dasher when the dispensing valve is open to dispense product. Opening of the dispensing valve closes the draw switch 71 and this applies power from line $L_1$ through conductor 90, switch 81a, mode switch 75, switch 82a, conductor 91, mode switch 76 and conductor 92, through the now closed draw switch 71, and conductor 98 to the solenoid 28a of refrigerant control valve 28. As previously described, the viscosity sensor 51 is arranged to reclose the viscosity switch 57 a short time interval, for example twenty seconds after it is opened, which short time interval is selected so as to allow sufficient time for the compressor to pump down the evaporator to the cut-out pressure PC, after the solenoid 28 is closed. If the draw switch is closed after the motor torque sensor recloses the viscosity switch 57, power will also be supplied through conductor 99 to the compressor motor control coil 42c and through conductors 101, 94, mode switch 77 and conductor 95 to the dasher motor control coil 41c to start the dasher drive motor 34. As previously described, when the compressor is started and refrigerant is again supplied to the evaporator, refrigerant also flows through capillary tubes 68 and 66 to apply pressure to the pressure sensor 61 and reset the pressure control switch 64 in its second condition engaging contact 64b. Pressure switch 64 will then continue the application of power to the compressor and dasher drive motors until the viscosity sensor 51 reopens the viscosity switch 57. On the other hand, if the draw switch is opened before the viscosity sensor closes the viscosity switch 57, and while the pressure switch is in its first condition engaging contact 64a, power will still be supplied through the closed draw switch and through pressure switch 64 and conductor 101 to the compressor motor control coil 42c to start the compressor motor. As previously described, as soon as the compressor motor is started, it will apply pressure through capillary tubes 68 to the pressure switch to move it to its second condition in engagement with contact 64b, and thereby continue operation of the compressor and dasher until the torque sensor de-energizes solenoid 28a and closes the refrigerant control valve 28.

From the foregoing it will be seen that supply of refrigerant to the evaporator and driving of the dasher is controlled by the viscosity sensor which stops the refrigerant supply to the evaporator when the viscosity of the product in the freezing chamber reaches a preselected value, as indicated by the motor torque. The supply of refrigerant to the evaporator is re-established under the control of either the refrigerant pressure sensor 61 or the draw switch 71. Refrigerant pressure sensor 61 senses the pressure in the evaporator, when the supply of refrigerant to the evaporator is shut off, and operates to start the compressor and dasher when the pressure on the refrigerant in the evaporator rises to a preselected value that is above the normal low side operating pressure, and at a pressure at which the temperature in the freezing chamber is below the freezing point of the product in the chamber. Alternatively, the compressor and dasher are automatically driven whenever the dispensing valve is open to dispense product from the freezing cylinder. Since the pressure switch senses the pressure which is indicative of the temperature of the evaporator, it more uniformly responds to the overall temperature of the freezing chamber, and not to the temperature at only a localized area. Further, sensing the pressure in the evaporator as an indication of the temperature of the freezing chamber, more accurately reflects the freezing cylinder temperature since the evaporator is in heat conducting relation with the freezing chamber, and is thermally insulated from the ambient air.

The embodiments of the invention in which an exclusive property or privilege is claimed are defined as follows:

1. A control system for controlling operation of a semi-frozen product dispensing machine of the type which includes a freezing chamber having an ingredient inlet and a product outlet, dispensing valve means selectively operable to intermittently dispense product through the product outlet, a rotary dasher in the freezing chamber and a dasher drive motor connected to the dasher, an evaporator in heat conducting relation with the freezing chamber having a refrigerant inlet and a refrigerant outlet, refrigerant producer means including a compressor and a condenser and having a high pressure refrigerant supply line and a low pressure refrigerant return line and a compressor drive motor connected to the compressor, means connecting the low pressure refrigerant return line to the refrigerant outlet of the evaporator and refrigerant expansion control means connecting the high pressure refrigerant supply line to the inlet of the evaporator operative to control normal low side operating pressure in the evaporator, the control system including:
   (a) viscosity sensing means operative when the dasher is driven for sensing the viscosity of the product in the freezing chamber;
   (b) means controlled by said viscosity sensing means for shutting off supply of refrigerant to the evaporator when the viscosity of the product sensed by the viscosity sensing means increases to the desired product consistency;
   (c) pressure sensing means operative to sense the refrigerant pressure in the evaporator when the supply of refrigerant to the evaporator is shut off;
   (d) means controlled by said pressure sensing means for supplying refrigerant to the evaporator when the pressure in the evaporator rises to a preselected pressure above normal low side operating pressure and at which preselected pressure the temperature of the refrigerant in the evaporator is below the freezing temperature of the product in the freezing chamber;
   (e) means for sensing when the dispensing valve is opened;
   (f) means for supplying refrigerant to the evaporator when the dispensing valve is open;
   (g) and means for driving the dasher at least while refrigerant is supplied to the evaporator.

2. A control system for controlling operation of a semi-frozen commestible dispensing machine according to claim 1 wherein pressure sensing means includes means for actuating a pressure switch means from a first condition to a second condition when the pressure sensed thereby rises to said preselected pressure and for moving the pressure switch means back to its first condition only when the pressure sensed thereby drops to a pressure below normal low side operating pressure, means operative when the pressure switch means is in its second condition for energizing the compressor drive motor and operative when the pressure switch means is in its first condition for de-energizing the compressor drive motor.

3. A control system for controlling operation of a semi-frozen commestible dispensing machine according to claim 2 including a refrigerant control valve in the refrigerant supply line ahead of the refrigerant expansion control means, said means controlled by the viscosity sensing means being operative to close said refrigerant control valve to shut off refrigerant supply to the evaporator when the viscosity of the product rises to the desired product consistency.

4. A control system for controlling operation of a semi-frozen commestible dispensing machine according to claim 3 including means operative when refrigerant is supplied to the evaporator for applying refrigerant pressure to said pressure sensing means above said preselected pressure.

5. A control system for controlling operation of a semi-frozen commestible dispensing machine according to claim 3 wherein said pressure sensing means is connected through a first refrigerant flow restrictor means to the evaporator outlet and through a second refrigerant flow restrictor means to the high pressure refrigerant supply line between the refrigerant control valve and the refrigerant expansion control means, said first and second flow restrictor means being arranged to apply pressure above said preselected pressure to the pressure sensing means when the compressor is energized and the refrigerant control valve is open and to apply the pressure at the evaporator outlet to the pressure sensing means when the refrigerator control valve is closed.

6. A control system for controlling operation of a semi-frozen commestible dispensing machine according to claim 3 wherein said viscosity sensing means is operative to move a viscosity switch from a first condition to a second condition when the viscosity of the product rises to the desired product consistency and to automatically reset the viscosity switch to its first condition after a preselected time delay, means operative when the viscosity switch is in its first condition for opening the refrigerant control valve and operative when the viscosity switch is in its second condition for closing the refrigerant control valve.

7. A control system for controlling operation of a semi-frozen commestible dispensing machine according to claim 6 wherein said viscosity sensing means is of a type that senses current conditions in the dasher drive motor.

8. A control system for controlling operation of a semi-frozen commestible dispensing machine according to claim 1 including a refrigerant control valve in the refrigerant supply line ahead of the refrigerant expansion control means, said means controlled by the viscosity sensing means being operative to close said refrigerant control valve to shut off refrigerant supply to the evaporator when the viscosity of the product rises to the desired product consistency.

9. A control system for controlling operation of a semi-frozen commestible dispensing machine according to claim 8 wherein said pressure sensing means is connected through a first refrigerant flow restrictor means to the evaporator outlet and through a second refrigerant flow restrictor means to the high pressure refrigerant supply line between the refrigerant control valve and the refrigerant expansion control means, said first and second flow restrictor means being arranged to apply pressure above said preselected pressure to the pressure sensing means when the compressor is energized and the refrigerant control valve is open and to apply the pressure at the evaporator outlet to the pressure sensing means when the refrigerant control valve is closed.

10. A control system for controlling operation of a semi-frozen commestible dispensing machine according to claim 9 wherein said viscosity sensing means is of a type that senses current conditions in the dasher drive motor.

11. A control system for controlling operation of a semi-frozen commestible dispensing machine according to claim 1 wherein said dasher drive motor is energized when the compressor drive motor is energized and de-energized when the compressor drive motor is de-energized.

12. A control system for controlling operation of a semi-frozen commestible dispensing machine of the type which includes a freezing chamber having a product ingredient inlet and a product outlet, dispensing valve means selectively operable to intermittently dispense product through the product outlet, a rotary dasher in the freezing chamber and a dasher drive motor connected to the dasher, an evaporator in heat conducting relation with the freezing chamber having a refrigerant inlet and a refrigerant outlet, refrigeration producer means including a compressor and a condensor and having a high pressure refrigerant supply line and a low pressure refrigerant return line and a compressor drive motor connected to the compressor, means connecting the low pressure refrigerant return line to the refrigerant outlet of the evaporator and refrigerant expansion control means connecting the high pressure refrigerant supply line to the inlet of the evaporator operative to control normal low side operating pressure in the evaporator, the control system including:

(a) viscosity sensing means operative when the dasher is driven for sensing the viscosity of the product in the freezing chamber and for actuating a viscosity switch from a first condition to a second condition when the viscosity of the product increases to the desired product consistency;

(b) refrigerant pressure sensing means operative when the pressure applied thereto rises to a preselected pressure above normal low side operating pressure for moving a pressure switch means from a first condition to a second condition and for moving the pressure switch means from the second condition back to its first condition only when the pressure applied thereto drops to a pressure below normal low side operating pressure;

(c) dispensing valve sensing means for sensing when the dispensing valve is opened and for operating a dispensing switch from a first condition to a second condition when the dispensing valve is open;

(d) a refrigerant control valve in the high pressure refrigerant supply line ahead of the refrigerant expansion control means;

(e) means operatively connecting the pressure sensing means to the evaporator to sense the refrigerant pressure in the evaporator when the supply of refrigerant to the evaporator is shut off;

(f) means controlled by the pressure switch means for energizing the compressor drive motor when the pressure switch is in its first condition;

(g) means controlled by the viscosity switch means for actuating the refrigerant control valve to its open condition when the viscosity switch means is in its first condition and for actuating the refrigerant control valve to its closed position when the viscosity switch means is in its second condition;

(h) means controlled by said dispensing switch means for actuating the refrigerant control valve to its open condition and for energizing the compressor drive motor when the dispensing switch is in its second condition;

(i) and means for energizing the dasher drive motor when the compressor drive motor is energized.

13. A control system for controlling operation of a semi-frozen commestible dispensing machine according to claim 12 wherein said means operatively connecting the pressure sensing means to the evaporator includes a refrigerant flow restrictor means connected to the refrigerant outlet of the evaporator to apply pressure to the pressure sensing means correlative with the evaporator pressure when the supply of refrigerant to the evaporator is shut off, and a second refrigerant flow restrictor connected to the high pressure refrigerant supply line between the refrigerant control valve and the refrigerant expansion control means to apply pressure sensing means above said preselected pressure when the compressor drive motor is energized and the refrigerant flow control valve is open.

14. A control system for controlling operation of a semi-frozen commestible dispensing machine according to claim 13 including means for de-energizing the dasher drive motor when the compressor drive motor is de-energized, said viscosity sensing means being operative to actuate said viscosity switch from its second condition back to its first condition a short time interval after the dasher drive motor is de-energized.

15. A control system for controlling operation of a semi-frozen commestible dispensing machine according to claim 14 wherein said viscosity sensing means is of a type that senses current conditions in the dasher drive motor.

16. A control system for controlling operation of a semi-frozen commestible dispensing machine according to claim 12 including means for de-energizing the dasher drive motor when the compressor drive motor is de-energized, said viscosity sensing means being operative to actuate said viscosity switch from its second condition back to its first condition a short time interval after the dasher drive motor is de-energized.

17. A method of controlling operation of a semi-frozen commestible dispensing machine of the type which includes a freezing chamber having a product ingredient inlet and a product outlet, a selectively operable dispensing valve for intermittently dispensing product through the product outlet, a rotary dasher in the freezing chamber and a dasher drive motor connected to the rotary dashers, an evaporator in heat conducting relation with the freezing chamber having a refrigerant inlet and a refrigerant outlet, refrigeration producer means including a compressor and a condenser and having a high pressure refrigerant supply line and a low pressure refrigerant return line, and a compressor drive motor connected to the compressor, means connecting the low pressure refrigerant return line to the refrigerant outlet of the evaporator, and refrigerant expansion control means connecting the high pressure refrigerant supply line to the inlet of the evaporator and operative to control normal low side operating pressure in the evaporator, the method comprising the steps of:
- (a) sensing the viscosity of the product in the freezing chamber while driving the dasher and while supplying refrigerant from the refrigerant supply line to the evaporator;
- (b) shutting off supply of refrigerant to the evaporator when the sensed viscosity of the product in the freezing chamber increases to the desired product viscosity;
- (c) sensing the refrigerant pressure in the evaporator when the refrigerant supply to the evaporator is shut off;
- (d) re-establishing supply of refrigerant to the evaporator when the sensed refrigerant pressure in the evaporator rises to a preselected pressure above normal low side operating pressure and at which preselected pressure the temperature of the refrigerant is below the freezing temperature of the product in the freezing chamber and
- (e) sensing when the dispensing valve is opened, and
- (f) re-establishing supply of refrigerant to the evaporator when the dispensing valve is open;
- (g) and continuing the supply of refrigerant to the evaporator after it has been re-established as set forth in either step (d) or (f) and until the supply of refrigerant to the evaporator is shut off as set forth in step (b).

18. A method of controlling operation of a semi-frozen commestible dispensing machine according to claim 17 including the step of driving the dasher when refrigerant is supplied to the evaporator and stopping the dasher when the refrigerant supply to the evaporator is shut off.

* * * * *

UNITED STATES PATENT AND TRADEMARK OFFICE
CERTIFICATE OF CORRECTION

PATENT NO. : 4,275,567
DATED : June 30, 1981
INVENTOR(S) : Stephen W. Schwitters It is certified that error appears in the above-identified patent and that said Letters Patent are hereby corrected as shown below:

Claim 5, column 10, line 35, "refrigerator" should be -- refrigerant --;

Claim 13, column 12, line 29, insert -- to the pressure -- before the word "sensing";

Claim 17, column 12, line 60, "dashers" should be -- dasher --.

Claim 12, column 12, line 3, the word "first" should be -- second --.

Signed and Sealed this

*Fifteenth* Day of *September 1981*

[SEAL]

*Attest:*

*Attesting Officer*

GERALD J. MOSSINGHOFF

*Commissioner of Patents and Trademarks*